(12) United States Patent
Park (10) Patent No.: US 10,423,323 B2
(45) Date of Patent: Sep. 24, 2019

(54) USER INTERFACE APPARATUS AND METHOD

(71) Applicants: Hyundai Motor Company, Seoul (KR); Kia Motors Corporation, Seoul (KR)

(72) Inventor: Jae Seok Park, Whasung-Si (KR)

(73) Assignees: Hyundai Motor Company, Seoul (KR); Kia Motors, Seoul (KR)

( * ) Notice: Subject to any disclaimer, the term of this patent is extended or adjusted under 35 U.S.C. 154(b) by 0 days.

(21) Appl. No.: 15/712,529

(22) Filed: Sep. 22, 2017

(65) Prior Publication Data

US 2018/0164974 A1 Jun. 14, 2018

(30) Foreign Application Priority Data

Dec. 13, 2016 (KR) .................. 10-2016-0169577

(51) Int. Cl.
| | |
|---|---|
| G06F 3/0488 | (2013.01) |
| G06F 3/0484 | (2013.01) |
| B60K 35/00 | (2006.01) |
| B60K 37/06 | (2006.01) |

(52) U.S. Cl.
CPC .......... G06F 3/0488 (2013.01); B60K 35/00 (2013.01); B60K 37/06 (2013.01); G06F 3/04842 (2013.01); B60K 2370/143 (2019.05); B60K 2370/1438 (2019.05); B60K 2370/164 (2019.05); G06F 2203/04808 (2013.01)

(58) Field of Classification Search
CPC .. G06F 3/0488; G06F 3/0484; G06F 3/04842; G06F 2203/04808; B60K 35/00; B60K 2350/1028
See application file for complete search history.

(56) References Cited

U.S. PATENT DOCUMENTS

| | | | |
|---|---|---|---|
| 5,943,043 A | 8/1999 | Furuhata et al. | |
| 8,169,380 B2 * | 5/2012 | Madonna .............. | G06F 3/0488 345/1.3 |
| 9,111,076 B2 * | 8/2015 | Park ...................... | G06F 3/0412 |
| 9,507,513 B2 * | 11/2016 | Gordon ............... | G06F 3/04883 |
| 9,733,752 B2 * | 8/2017 | Park ...................... | G06F 3/0412 |
| 9,733,828 B2 * | 8/2017 | Ji ......................... | G06F 3/0416 |
| 9,807,694 B2 * | 10/2017 | Yoon ..................... | G06F 3/0488 |
| 2008/0225008 A1 * | 9/2008 | Madonna .............. | G06F 3/0488 345/173 |
| 2012/0154293 A1 * | 6/2012 | Hinckley .............. | G06F 1/1694 345/173 |

(Continued)

FOREIGN PATENT DOCUMENTS

| | | |
|---|---|---|
| JP | 5573814 B2 | 8/2014 |
| JP | 2014-190947 A | 10/2014 |
| KR | 10-1553119 B1 | 9/2015 |

*Primary Examiner* — Peter D McLoone
(74) *Attorney, Agent, or Firm* — Morgan, Lewis & Bockius LLP (57) ABSTRACT

A vehicle terminal may include a touch interface that detects a touch input that is input at a point of a touch panel and when a main controller detects a first tap that is input to the touch panel and then detects at least one second tap within a specified time period with the first tap maintained, the main controller that recognizes a tap-tap interaction based on an input direction of the first tap and the at least one second tap and processes a function that is assigned to the recognized tap-tap interaction.

14 Claims, 9 Drawing Sheets

(56) References Cited

U.S. PATENT DOCUMENTS

| | | | |
|---|---|---|---|
| 2012/0154294 A1* | 6/2012 | Hinckley | G06F 1/1649 345/173 |
| 2013/0106749 A1 | 5/2013 | Hosono et al. | |
| 2015/0135080 A1* | 5/2015 | Ji | G06F 3/0416 715/728 |
| 2015/0138101 A1* | 5/2015 | Park | G06F 3/0412 345/173 |
| 2015/0186026 A1* | 7/2015 | Gordon | G06F 3/04883 345/173 |
| 2015/0195789 A1* | 7/2015 | Yoon | G06F 3/0488 345/173 |
| 2015/0309657 A1* | 10/2015 | Park | G06F 3/0412 345/173 |
| 2016/0110005 A1* | 4/2016 | Yin | G06F 3/017 345/173 |
| 2017/0220517 A1* | 8/2017 | Khan | G06F 13/364 |

* cited by examiner

USER INTERFACE APPARATUS AND METHOD

CROSS-REFERENCE TO RELATED APPLICATION

The present application claims priority to Korean Patent Application No. 10-2016-0169577, filed on Dec. 13, 2016, the entire contents of which is incorporated herein for all purposes by this reference.

BACKGROUND OF THE INVENTION

Field of the Invention

The present invention relates to a user interface apparatus and a user interface method that provide a new touch interaction by adding directivity to a tap-tap interaction.

Description of-Related Art

A touch interaction is applied to a vehicle terminal, such as an audio video navigation (AVN) device in a vehicle, as well as a mobile device. As the hardware performance of the vehicle terminal is improved and the vehicle terminal provides functions of which the number is greater than the number of functions of a conventional vehicle terminal, a new input method for easily and intuitively manipulating the functions is needed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a user interface apparatus and a user interface method that provide a new touch interaction by adding directivity to a tap-tap interaction.

The technical problems to be solved by the present inventive concept are not limited to the aforementioned problems, and any other technical problems not mentioned herein will be clearly understood from the following description by those skilled in the art to which the present invention pertains.

According to various aspects of the present invention, a vehicle terminal may include a touch interface that detects a touch input that is input at one point of a touch panel and when a main controller detects a first tap that is input to the touch panel and then detects at least one second tap within a specified time period with the first tap maintained, the main controller that recognizes a tap-tap interaction based on an input direction of the first tap and the at least one second tap and processes a function that is assigned to the recognized tap-tap interaction.

The touch interface may include a touch panel that outputs electronic signals based on the touch input, a touch controller that outputs coordinate data of the one point of the touch panel by processing the electronic signals, and a deserializer that transmits the coordinate data in parallel.

The main controller may include: a serializer that communicates with the deserializer; and a processing device that recognizes the tap-tap interaction by use of the coordinate data of the one point of the touch panel received through the serializer.

The processing device may determine the input direction by use of pieces of coordinate data of a point, to which the first tap is input, and a point to which the at least one second tap is input.

The processing device may recognize the touch input as a first tap-tap interaction, when the at least one second tap is detected at one point of a first direction from the point to which the first tap is input, in a state where an input of the first tap is maintained.

The processing device may recognize the touch input as a second tap-tap interaction, when the at least one second tap is detected at one point of a second direction from the point to which the first tap is input, in a state where an input of the first tap is maintained.

The processing device may recognize the touch input as a third tap-tap interaction, when the at least one second tap is detected at one point of a third direction from the point to which the first tap is input, in a state where an input of the first tap is maintained.

The processing device may recognize the touch input as a fourth tap-tap interaction, when the at least one second tap is detected at one point of a fourth direction from the point to which the first tap is input, in a state where an input of the first tap is maintained.

According to another aspect of the present invention, a method of operating a vehicle terminal including a touch interface may include detecting a first tap that is input to one point on a touch panel; detecting at least one second tap within a specified time period with the first tap maintained, after the detecting of the first tap; and performing a function based on an input direction of the first tap and the at least one second tap, when the at least one second tap is detected.

The performing of the function based on the input direction may include: determining whether a distance between a point to which the first tap is input, and a point to which the at least one second tap is input is changed; and recognizing a tap-tap interaction based on the input direction of the first tap and the at least one second tap, when the distance is not changed.

The recognizing of the tap-tap interaction may include: recognizing a touch input as a first tap-tap interaction, when the at least one second tap is detected at one point of a first direction from the point to which the first tap is input.

The recognizing of the tap-tap interaction may include: recognizing a touch input as a second tap-tap interaction, when the at least one second tap is detected at one point of a second direction from the point to which the first tap is input.

The recognizing of the tap-tap interaction may include: recognizing a touch input as a third tap-tap interaction, when the at least one second tap is detected at one point of a third direction from the point to which the first tap is input.

The recognizing of the tap-tap interaction may include: recognizing a touch input as a fourth tap-tap interaction, when the at least one second tap is detected at one point of a fourth direction from the point to which the first tap is input.

The methods and apparatuses of the present invention have other features and advantages which will be apparent from or are set forth in more detail in the accompanying drawings, which are incorporated herein, and the following Detailed Description, which together are configured to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

The terms, such as "comprising", "including", and "having", which are described in the specification mean that a corresponding element may be provided as long as there is no particularly contradictory description, and may mean that another element is not excluded but may be further included.

Further, the terms, such as "unit", "-er, -or", and "module" described in the specification mean a unit for processing at least one function or operation, and may be implemented by hardware, software, or a combination of hardware and software. Further, the articles, such as "a (an)" and "the", may be used to include both a singular form and a plural form as long as another meaning is indicated or the meaning is not clearly contradicted by the context describing the present invention unlike the specification.

Below, embodiments of the inventive concept will be more fully described with reference to accompanying drawings.

Figure 1:
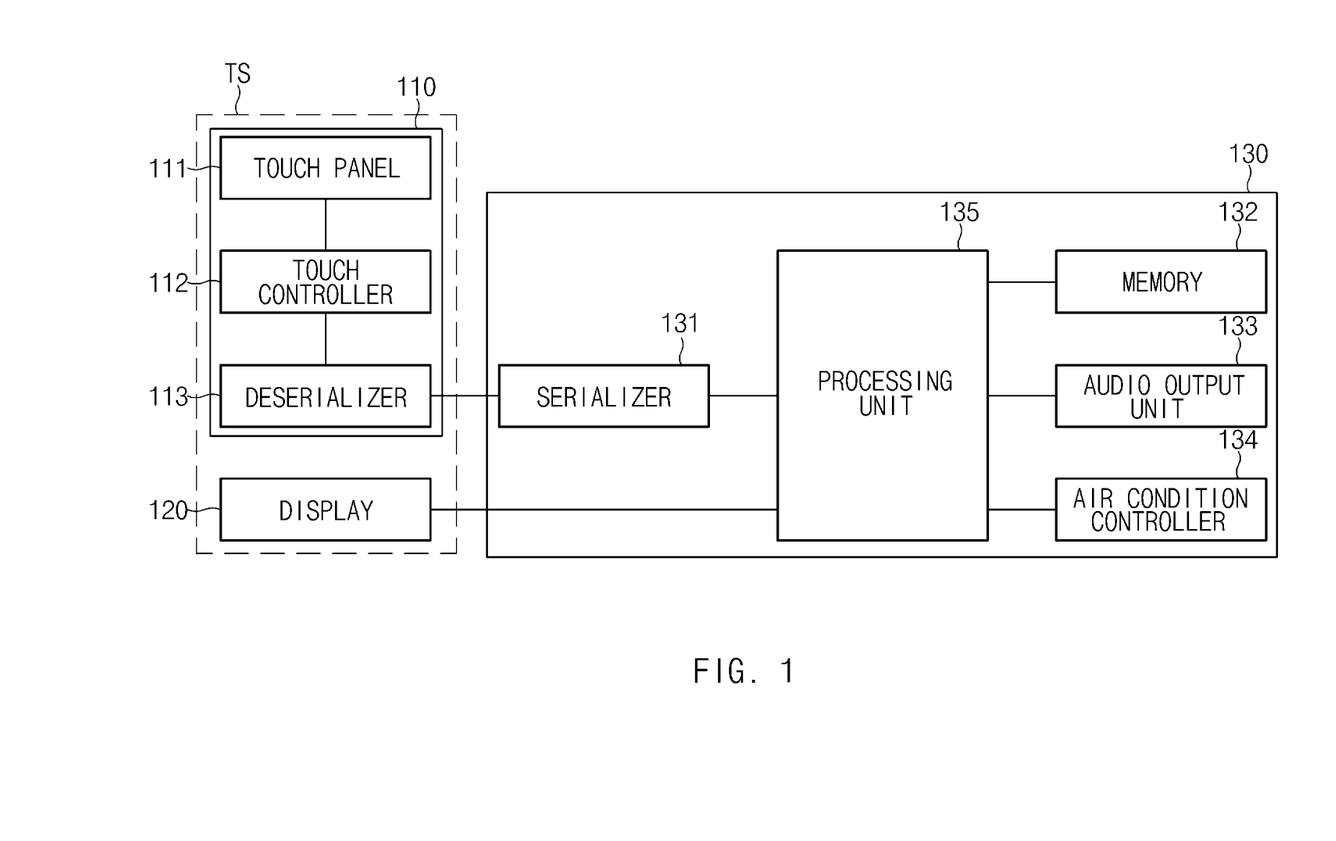
FIG. 1 illustrates a block diagram of a user interface apparatus, according to an exemplary embodiment of the present invention

FIG. 1 illustrates a block diagram of a user interface apparatus, according to an exemplary embodiment of the present invention. FIG. 2A, FIG. 2B, FIG. 2C, and FIG. 2D are drawings for describing a touch interaction associated with the present invention. Here, the user interface apparatus may be implemented with a vehicle terminal of an Audio Video Navigation (AVN) device.

The user interface apparatus includes a touch interface 110, a display 120, and a main controller 130.

The touch interface 110 recognizes a touch input that is input by a user. In other words, the touch interface 110 allows the user to input a command or data.

Herein, as illustrated in Table 1, touch inputs are classified into a short tap, a double tap, a long tap, a pinch in, a pinch out, and a tap-tap.

TABLE 1

| Classification | Action |
| --- | --- |
| Short tap | Touch one point on a touch panel once within a specific time period (e.g., 1 sec) |
| Double tap | Touch one point on a touch panel successively twice for a specific time period |
| long tap | Maintain a touch operation on one point on a touch panel for a specific time period or more |
| Pinch in | Another touch point is input to another point within a specific time period in a state where a touch operation is maintained at one point on a touch panel, and two touch points move away from each other. |
| Pinch out | Another touch point is input to another point within a specific time period in a state where a touch operation is maintained at one point on a touch panel, and two touch points approach each other. |
| Tap-tap | Another touch point is input to another point within a specific time period in a state where a touch operation is maintained at one point on a touch panel. |

The touch interface 110 includes a touch panel 111, a touch controller 112, and a deserializer 113.

The touch panel 111 may be a sensor that detects a touch operation of the user and may be implemented in a form of a touch film, a touch sheet, or a touch pad. The touch panel 111 may be implemented in a form of a touch screen TS by combining the display 120. In the instant case, the touch screen TS may be used as an output device and an input device.

The touch panel 111 converts the change in a pressure, which is applied to one point on the touch panel 111, or a capacitance into an electronic signal. The touch panel 111 is configured to detect a pressure during a touch operation, in addition to a location (coordinates) and an area of a touch point.

The touch controller 112 outputs coordinate data (a coordinate value) of the touch point by processing electronic signal(s) input from the touch panel 111. In other words, the touch controller 112 detects a touch input, which is generated on the touch panel 111, and outputs the location coordinates of the touch point at which the detected touch input is generated.

The deserializer 113 performs inter-integrated circuit (I2C) communication with the touch controller 112. The deserializer 113 converts coordinate data received from the touch controller 112 into parallelized coordinate data and outputs the parallelized coordinate data. In other words, the deserializer 113 transmits the coordinate data of the touch point in parallel.

The display 120 displays information that the main controller 130 processes. For example, the display 120 displays a user interface (UI) or a graphic user interface (GUI) associated with an AVN manipulation, a map, or an image.

The display device 120 may be implemented in a form of any one of a liquid crystal display (LCD), a thin film transistor-liquid crystal display (TFT-LCD), an organic light-emitting diode (OLED), a flexible display, a 3D display, and a transparent display.

The main controller 130 distinguishes (recognizes) a touch input detected through the touch interface 110 and performs a function assigned to the distinguished touch input. The main controller 130 includes a serializer 131, a memory 132, an audio output device 133, an air condition controller 134, and a processing device 135.

The serializer 131 sorts data, which is transmitted from the deserializer 113 in parallel, based on a time and converts the sorted data into serialized data. The serializer 131 transmits coordinate data of the touch point, which is received through the serializer 131, to the processing device 135 through the I2C communication.

The memory 132 may store a program for overall operations of the processing device 135 and may temporarily store the received coordinate data of the touch point. The memory 132 may store map data, audio data and image data.

The memory 132 may be implemented by one or more of storage media including a flash memory, a hard disk, a secure digital (SD) card, a random access memory (RAM), a read only memory (ROM), and web storage.

The audio output device 133 outputs audio data stored in the memory 132. The audio output device 133 may include a receiver, a speaker, and/or a buzzer.

The air condition controller 134 controls the temperature, humidity, air cleanliness, and air flow in a vehicle by adjusting the air flow rate (wind intensity), air flow direction (a wind direction) during the cooling or heating of the vehicle.

The processing device 135 plays audio and/or video stored in the memory 132 and outputs the played audio and/or video to the audio output device 133 and/or the display 120. The processing device 135 may provide route guidance to the destination and/or road information by use of a global positioning system (GPS) receiver and map data stored in the memory 132. In addition, the processing device 135 adjusts an air condition in the vehicle by controlling the air condition controller 134.

When a second tap is detected after the processing device 135 detects a first tap (a touch input) through the touch interface 110, the processing device 135 determines whether the second tap is detected within a first threshold time (e.g., 800 ms) after the first tap is detected. The processing device 135 determines whether the second tap is input to a second point on the surface of the touch interface 110 within the first threshold time after the first tap is input to a first point on a surface of the touch interface 110. Herein, a tap may indicate a state in which the user touches one point on a screen of the touch screen TS by use of his or her finger or a stylus.

When the second tap is detected within the first threshold time after the first tap is detected, the processing device 135 determines whether the second tap is detected, with the first tap maintained. In other words, the processing device 135 determines whether a new touch operation is performed at the first point and the second point, in a state where a touch operation is maintained at the first point. In the instant case, the processing device 135 determines whether the first point and the second point are different from each other.

When the second tap is detected with the first tap is maintained, the processing device 135 determines whether a distance between a point (a first tap point), to which the first tap is input, and a point (a second tap point) to which the second tap is input is changed. When the distance is not changed, the processing device 135 performs an operation based on an input direction of the first tap and the second tap.

In the instant case, the processing device 135 recognizes a tap-tap interaction to which directivity is added, by checking a direction of the point (the second tap point) to which the second tap is input with respect to the point (the first tap point) to which the first tap is input.

As illustrated in FIG. 2A, FIG. 2B, FIG. 2C, and FIG. 2D, tap-tap interactions may be classified into four cases based on the input direction of the first tap and the second tap.

Figure 2A:
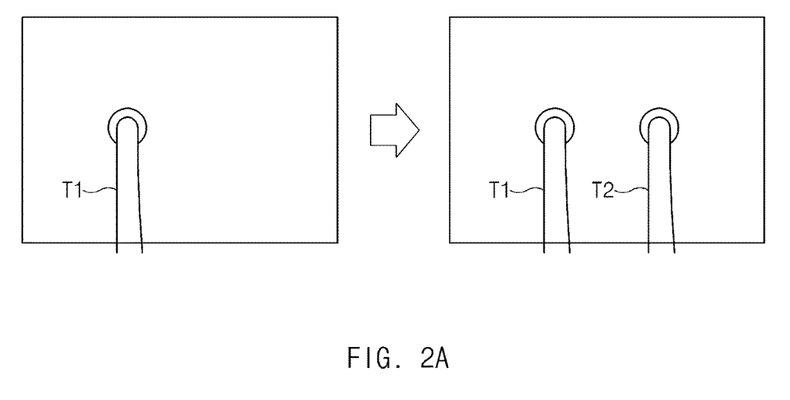
FIG. 2A, FIG. 2B, FIG. 2C, and FIG. 2D are drawings for describing a touch interaction associated with the present invention.

As illustrated in FIG. 2A, a first tap-tap interaction is a left and right (LR) tap-tap in which the second tap is input to one point of the right side (a first direction) from a point to which the first tap is input in a state where the input of the first tap is maintained.

Figure 2B:
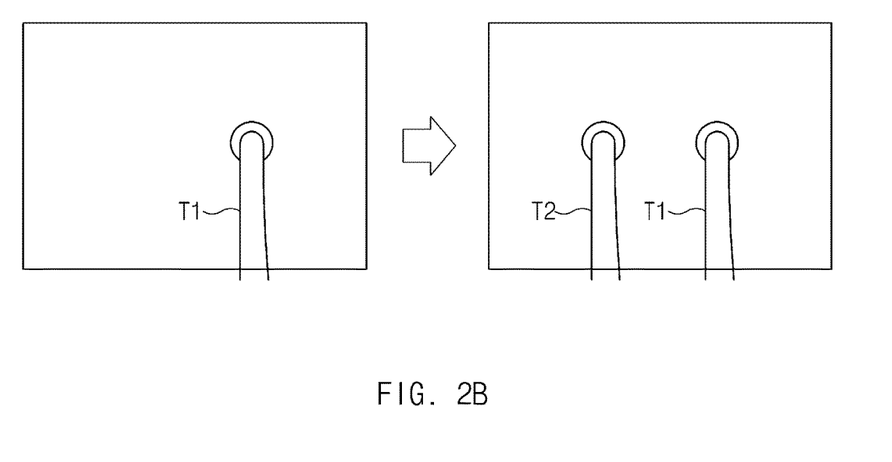

As illustrated in FIG. 2B, a second tap-tap interaction is a right-left (RL) tap-tap in which the second tap is input to one point of the left side (a second direction) from a point to which the first tap is input in a state where the input of the first tap is maintained.

Figure 2C:
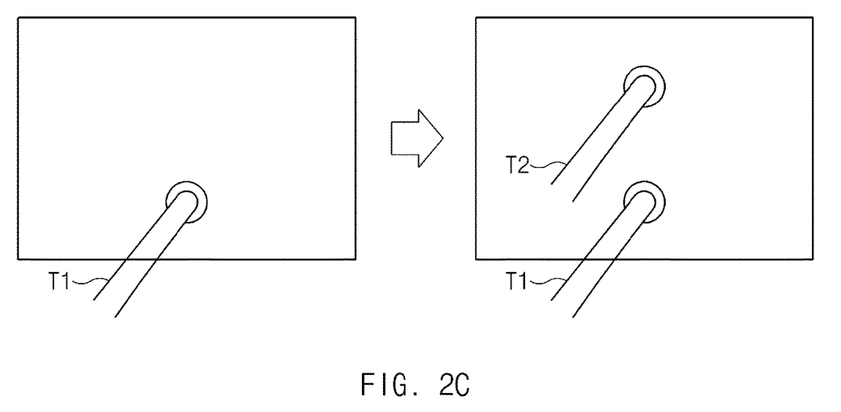

As illustrated in FIG. 2C, a third tap-tap interaction is a down-up (DU) tap-tap in which the second tap is input to one point of the up side (a third direction) from a point to which the first tap is input in a state where the input of the first tap is maintained.

Figure 2D:
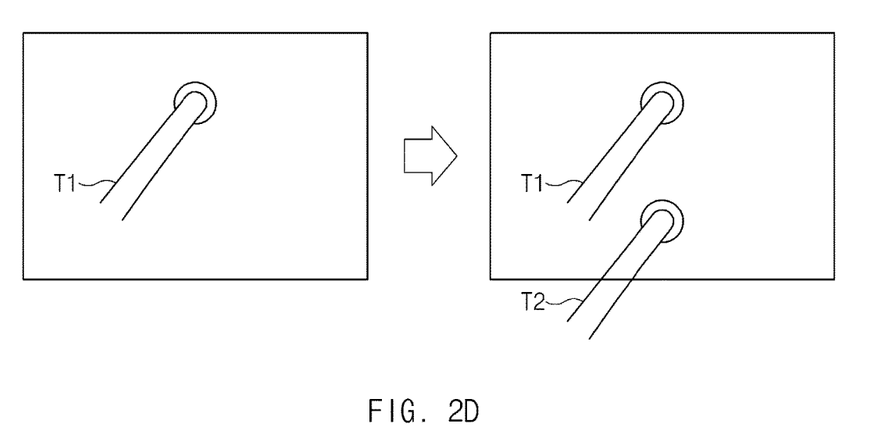

As illustrated in FIG. 2D, a fourth tap-tap interaction is an up and down (UD) tap-tap in which the second tap is input to one point of the down side (a fourth direction) from a point to which the first tap is input in a state where the input of the first tap is maintained. In the present embodiment, it is described that touch inputs are classified into four input directions based on a direction, in which the second tap is input, with respect to the first tap. However, an exemplary embodiment of the present invention is not limited thereto. For example, the touch inputs are classified into five or more input directions.

The processing device 135 may determine an input direction through arithmetic processing using pieces of coordinate data of the first tap point and the second tap point. For example, when the coordinate data of the first tap point is (x1, y1) and the coordinate data of the second tap is (x2, y2), the processing device 135 determines whether when |x2−x1|>|y2−x2−x1|>0. When x2−x1>0, the processing device 135 determines a touch input as the LR tap-tap. When x2−x1≤0, the processing device 135 determines the touch input as the RL tap-tap.

Meanwhile, when |x2−x1|≤y2−y1, the processing device 135 determines whether y2−y>0. When y2−y>0, the processing device 135 determines the touch input as the DU tap-tap. When y2−y1≤0, the processing device 135 determines the touch input as the UD tap-tap.

When the second tap is not detected within the first threshold time after the first tap is detected, the processing device 135 determines whether the first tap is maintained for a second threshold time (e.g., 800 ms) or more. When the first tap is maintained for the second threshold time or more, the processing device 135 performs a function corresponding to (defined as) the long tap. When the first tap is maintained for less than the second threshold time, the processing device 135 performs a function corresponding to the short tap.

When the second tap is detected within the first threshold time in a state where the first tap is not maintained, the processing device 135 performs a function corresponding to the double tap. In the instant case, a point, to which the first tap is input, and a point to which the second tap is input are the same as each other or are located within a specified distance.

When a distance between the first tap point and the second tap point is changed, the processing device 135 performs a function assigned to the pinch in or the pinch out. When the distance between the first tap point and the second tap point decreases, the processing device 135 recognizes the touch input as the pinch out. When the distance between the first tap point and the second tap point increases, the processing device 135 recognizes the touch input as the pinch in.

Figure 3:
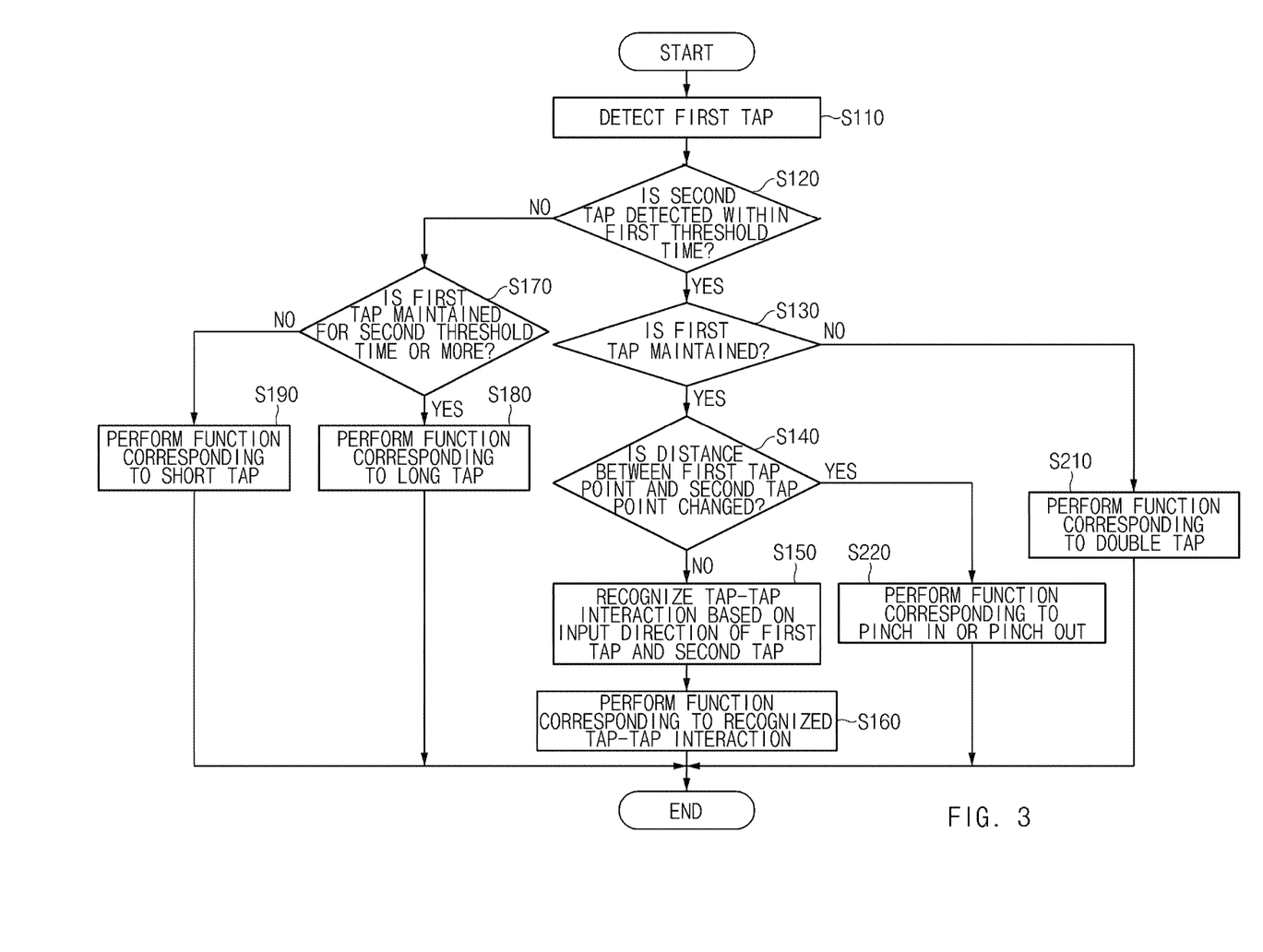
FIG. 3 is a flowchart illustrating a user interface method, according to an exemplary embodiment of the present invention.

FIG. 3 is a flowchart illustrating a user interface method, according to an exemplary embodiment of the present invention.

In operation S110, the processing device 135 detects a first tap input to the touch interface 110. When a touch input is generated in one point on a surface of the touch interface 110, the processing device 135 recognizes the corresponding touch input as the first tap.

In operation S120, the processing device 135 determines whether at least one second tap is detected on the touch interface 110 within a first threshold time (e.g., 800 ms) after the first tap is detected.

When the second tap is detected in operation S120, in operation S130, the processing device 135 determines whether the input of the first tap is maintained. In other words, the processing device 135 determines whether the second tap is detected within the first threshold time in a state where the first tap is maintained. In the instant case, the processing device 135 determines whether a distance between a point, to which the first tap on the surface of the touch interface 110 is input, and a point to which the second tap is input exceeds a threshold value.

In operation S140, when the first tap is maintained, the processing device 135 determines whether a distance between a point (a first tap point), to which the first tap is input, and a point (a second tap point) to which the second tap is input is changed. In the instant case, the distance between the first tap point and the second tap point exceeds the threshold value.

In operation S150, when the distance between the first tap point and the second tap point is not changed, the processing device 135 recognizes a tap-tap interaction based on an input direction of the first tap and the second tap. The processing device 135 determines a tap-tap interaction among four tap-tap interactions based on the input direction of the first tap and the second tap.

In operation S160, the processing device 135 performs a function assigned to the recognized tap-tap interaction.

In operation S120, when the second tap is not detected, in operation S170, the processing device 135 determines whether the first tap is maintained for a second threshold time or more. In operation S180, when the first tap is maintained for a second threshold time or more, the processing device 135 recognizes a touch input as a long tap and performs a function assigned to the long tap.

Meanwhile, in operation S190, when the first tap is maintained for less than the second threshold time, the processing device 135 performs a function corresponding to a short tap.

In operation S130, when the first tap is not maintained, in operation S210, the processing device 135 recognizes the touch input as a double tap and performs a function corresponding to the double tap. In the instant case, the distance between the first tap point and the second tap point is greater than '0' and is less than the threshold value.

In operation S140, when the distance between the first tap point and the second tap point is changed, in operation S220, the processing device 135 recognizes the touch input as a pinch in or a pinch out and performs a function corresponding to the pinch in or the pinch out. When the distance between the first tap point and the second tap point gradually increases, the processing device 135 recognizes the touch input as the pinch in. When the distance between the first tap point and the second tap point gradually decreases, the processing device 135 recognizes the touch input as the pinch out.

Figure 4:
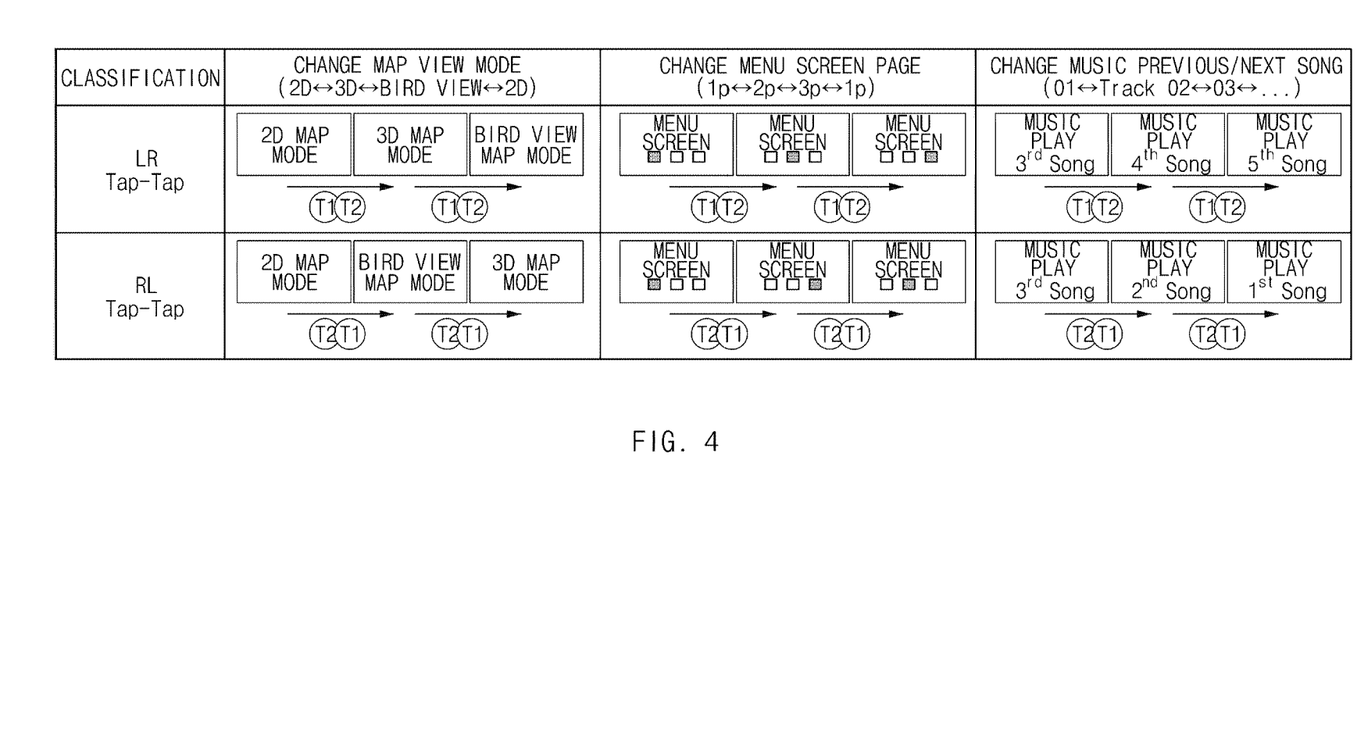
FIG. 4 and FIG. 5 are drawings for describing a function execution based on a tap-tap interaction, according to an exemplary embodiment of the present invention.
Figure 5:
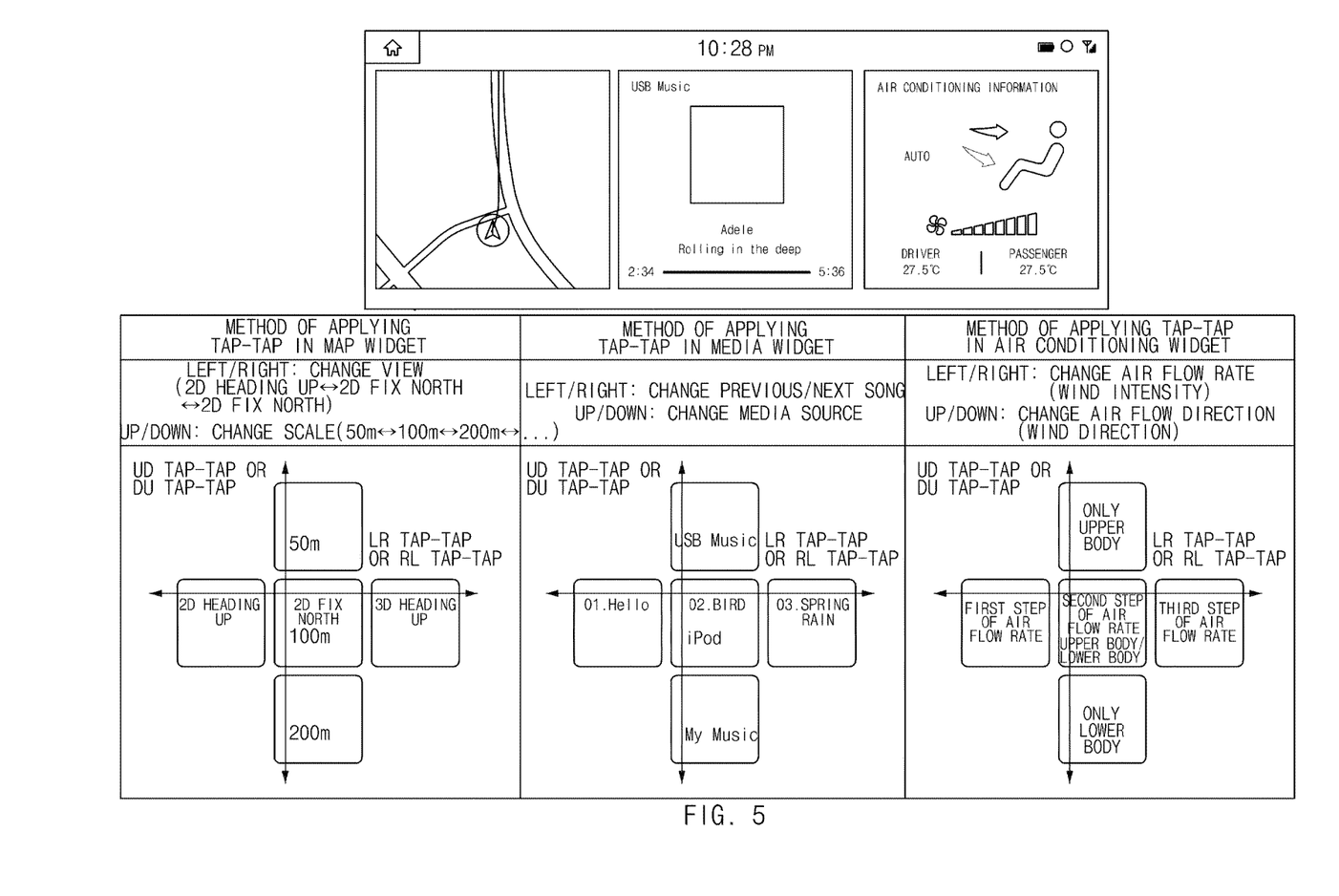

FIG. 4 and FIG. 5 are drawings for describing a function execution based on a tap-tap interaction, according to an exemplary embodiment of the present invention.

As illustrated in FIG. 4, whenever an input of a LR tap-tap is detected on the screen in a state where a map is displayed on a screen of the display 120 in a 2D mode, the processing device 135 changes a map view mode from the 2D mode to a 3D mode, from the 3D mode to a bird view mode, or from the bird view mode to the 2D mode. Meanwhile, whenever an input of a RL tap-tap is detected on the screen, the processing device 135 sequentially changes the map view mode to the 2D mode, the bird view mode, and the 3D mode.

When a menu screen is displayed on the display screen, when an input of a LR tap-tap is detected on the screen, the processing device 135 converts a current screen into a next menu screen and displays the converted menu screen. In addition, when an input of a RL tap-tap is detected, the processing device 135 converts the current screen into a previous menu screen and displays the converted menu screen.

When music is being played, when the input of the LR tap-tap is detected on the screen, the processing device 135 plays the next song and outputs the next song. Meanwhile, when the input of the RL tap-tap is detected, the processing device 135 plays the previous song and outputs the previous song.

As illustrated in FIG. 5, when a map widget, a media widget, and an air condition widget are displayed on the touch screen TS, when each widget is selected, the processing device 135 enters the main screen of the corresponding widget. For example, when a map widget is selected, the current screen is transitioned to a map full screen. When the media widget is selected, the current screen is transitioned to a media full screen. When the air condition widget is selected, the current screen is transitioned to an air condition full screen.

When the LR tap-tap is input on the map widget or the RL tap-tap is input on the map widget, the processing device 135 changes a map view mode. When the UD tap-tap or the DU tap-tap is input, the processing device 135 changes a scale of a map.

Alternatively, when the LR tap-tap or the RL tap-tap is input on the media widget, the processing device 135 plays the previous song or the next song and outputs the corresponding song. When the UD tap-tap or the DU tap-tap is input, the processing device 135 changes a media source. For example, the processing device 135 changes a music folder in response to the UD tap-tap or the DU tap-tap.

Alternatively, when the LR tap-tap or the RL tap-tap is input on the air condition widget, the processing device 135 changes air flow rate. When the UD tap-tap or the DU tap-tap is input, the processing device 135 changes a wind direction.

Figure 6:
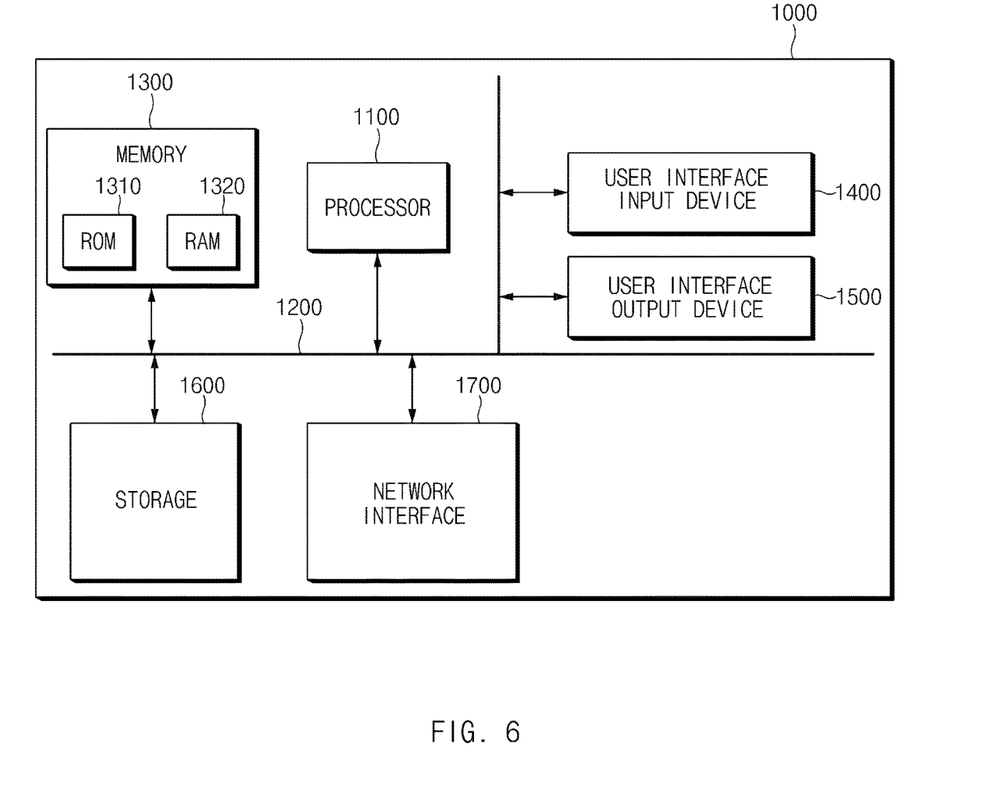
FIG. 6 is a block diagram illustrating a computing system that performs a user interface method, according to an exemplary embodiment of the present invention.

FIG. 6 is a block diagram illustrating a computing system that performs a user interface method, according to an exemplary embodiment of the present invention.

Referring to FIG. 6, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments included in the specification may be directly implemented with a hardware module, a software module, or combinations thereof, executed by the processor 1100. The software module may reside on a storage medium (e.g., the memory 1300 and/or the storage 1600) including a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as a separate component of the user terminal.

As a new touch interaction is provided by adding directivity to a tap-tap interaction, a user may intuitively and easily manipulate the vehicle terminal in a limited small touch space.

Although it has been described until now that all the elements that form the embodiments of the present invention are coupled into one or are coupled to each other to be operated, the present invention is not necessarily limited to the embodiments. That is, without departing from the purpose of the present invention, all the elements may be selectively coupled into one or more elements to be operated. Further, although each of all the elements may be implemented by one piece of hardware independently, some or all of the elements may be selectively combined and may be implemented by a computer program having program modules for performing the functions of some or all elements combined by one or a plurality pieces of hardware. Codes and code segments that form the computer program may be easily inferred by those skilled in the art. The computer program may be stored in a computer-readable medium and read and executed by a computer to implement the embodiments of the present invention.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle terminal comprising:
a touch interface configured to detect a touch input that is input at a point of a touch panel; and
a main controller configured to, when the main controller detects a first tap that is input to the touch panel and then detects at least one second tap within a time period while the first tap is maintained, determines a tap-tap interaction among four tap-tap interactions based on an input direction of the first tap and the at least one second tap and process a function that is assigned to the determined tap-tap interaction,
wherein the main controller determines an input direction of the tap-tap interaction through arithmetic processing using pieces of coordinate data of a first tap point and a second tap point, and
wherein the arithmetic processing includes:
determining whether $|x2-x1|>|y2-y1|$, $x2-x1>0$, when the coordinates data of the first tap point is $(x1, y1)$ and the coordinate data of the second tap is $(x2, y2)$;
determining a left-right (LR) tap-tap interaction when $x2-x1>0$ and a right-left (RL) tap-tan interaction when $x2-x1\leq 0$,
determining whether $|x2-x1|\leq|y2-y1|$, $y2-y1>0$, when the coordinate data of the first tan point is $(x1, y1)$ and the coordinate data of the second tap is $(x2, y2)$;
determining a down-up (DU) tap-tap interaction when $y2-y1>0$ and an up-down (UD) tap-tap interaction when $y2-y1\leq 0$.

2. The vehicle terminal of claim 1, wherein the touch interface includes:
the touch panel configured to output electronic signals based on the touch input;
a touch controller configured to output coordinate data of a first point of the touch panel by processing the electronic signals; and
a deserializer configured to transmit the coordinate data of the first point in parallel.

3. The vehicle terminal of claim 2, wherein the main controller includes:
a serializer configured to communicate with the deserializer, and
a processing device configured to recognize the tap-tap interaction by use of the coordinate data of the first point of the touch panel received through the serializer.

4. The vehicle terminal of claim 3, wherein the processing device is configured to determine the input direction by use of pieces of coordinate data of a point, to which the first tap is input, and a point to which the at least one second tap is input.

5. The vehicle terminal of claim 4, wherein the processing device recognizes the touch input as a first tap-tap interaction, when the at least one second tap is detected at a point of a first direction from the point to which the first tap is input, in a state where an input of the first tap is maintained.

6. The vehicle terminal of claim 4, wherein the processing device recognizes the touch input as a second tap-tap interaction, when the at least one second tap is detected at a point of a second direction from the point to which the first tap is input, in a state where an input of the first tap is maintained.

7. The vehicle terminal of claim 4, wherein the processing device is configured to recognize the touch input as a third tap-tap interaction, when the at least one second tap is detected at a point of a third direction from the point to which the first tap is input, in a state where an input of the first tap is maintained.

8. The vehicle terminal of claim 4, wherein the processing device recognizes the touch input as a fourth tap-tap interaction, when the at least one second tap is detected at a point of a fourth direction from the point to which the first tap is input, in a state where an input of the first tap is maintained.

9. A method of operating a vehicle terminal including a touch interface, the method comprising:
- detecting a first tap that is input to a point on a touch panel;
- detecting at least one second tap within a time period while the first tap is maintained, after the detecting of the first tap;
- determining a tap-tap interaction among four tap-tap interactions based on an input direction of the first tap and the at least one second tap, and an input direction of the tap-tan interaction through arithmetic processing using pieces of coordinates data of a first tap point and a second tap point; and
- performing a function based on the input direction of the first tap and the at least one second tap, when the at least one second tap is detected, wherein the arithmetic processing includes:
- determining whether $|x2-x1|>|y2-y1|$, $x2-x1>0$, when the coordinates data of the first tap point is (x1, y1) and the coordinate data of the second tap is (x2, y2);
- determining a left-right (LR) tap-tap interaction when $x2-x1>0$ and a right-left (RL) tap-tap interaction when $x2-x1\leq 0$;
- determining whether $|x2-x1|\leq|y2-y1|$, $y2-y1>0$, when the coordinate data of the first tap point is (x1, y1) and the coordinate data of the second tap is (x2, y2);
- determining a down-up (DU) tap-tap interaction when $y2-y1>0$ and an up-down (UD) tap-tap interaction when $y2-y1\leq 0$.

10. The method of claim 9, wherein the performing of the function based on the input direction includes:
- determining whether a distance between a point to which the first tap is input, and a point to which the at least one second tap is input is changed; and
- recognizing a tap-tap interaction based on the input direction of the first tap and the at least one second tap, when the distance is not changed.

11. The method of claim 10, wherein the recognizing of the tap-tap interaction includes:
- recognizing a touch input as a first tap-tap interaction, when the at least one second tap is detected at a point of a first direction from the point to which the first tap is input.

12. The method of claim 10, wherein the recognizing of the tap-tap interaction includes:
- recognizing a touch input as a second tap-tap interaction, when the at least one second tap is detected at a point of a second direction from the point to which the first tap is input.

13. The method of claim 10, wherein the recognizing of the tap-tap interaction includes:
- recognizing a touch input as a third tap-tap interaction, when the at least one second tap is detected at a point of a third direction from the point to which the first tap is input.

14. The method of claim 10, wherein the recognizing of the tap-tap interaction includes:
- recognizing a touch input as a fourth tap-tap interaction, when the at least one second tap is detected at a point of a fourth direction from the point to which the first tap is input.

* * * * *